United States Patent Office 2,805,964
Patented Sept. 10, 1957

2,805,964
TREATMENT OF PLASTICS

William M. Lee, Ambler, and Louis Philip Muller, Flourtown, Pa., assignors to Pennsalt Chemical Corporation, a corporation of Pennsylvania No Drawing. Application April 4, 1956,
Serial No. 575,952

16 Claims. (Cl. 117—139.5)

This invention relates to a class of non-cellulosic hydrophobic synthetic plastic materials, in the form of fibers, yarns, filaments, films, textiles, and the like having improved physical characteristics. In particular this invention pertains to plastic materials of the synthetic types represented by polyacrylonitrile, nylon, polyvinyl chloride, and polyethylene terephthalate and their variations having improved antistatic properties, and to the processes, agents and compositions for improving the antistatic properties of said synthetic plastic materials and of textiles made therefrom.

The build-up of the static electricity which is developed by friction in the handling, rubbing and movement of fibers, yarns, filaments, films, textiles and the like made of the above synthetic materials is a commonly experienced annoyance, especially during manufacturing operations in the textile industry. Consequently, many agents and compositions of an antistatic character have been developed and are being used in the art in an effort to minimize the difficulties caused by the electrical charges on such synthetic materials. A good review of generally useful agents, particularly for use in the textile industry, is given by Hayek in "Antistatic Finishes for Textiles," American Dyestuff Reporter, 43, p. 368–71, June 7, 1954. As stated in the review, agents of antistatic value appear to be materials whose antistatic properties are due to the reduction in surface resistivity of treated materials by the combination of antistatic agent and water.

Although many antistats are known and have been used, not all of them are effective on non-cellulosic materials. A group of antistats which is effective on cotton textiles, for example, may not be effective on the more highly electrically charged hydrophobic synthetic textiles. Furthermore, in addition to being effective, a suitable antistat for use on the synthetic materials to which this invention relates must also be chemically compatible with the plastic material, and with other chemical ingredients present in and on the material, such as plasticizers, lubricants and sizes. The antistatic agent also should not have a corrosive or fouling effect on the equipment in which various forms of the synthetic materials, e. g. films or textiles, are processed.

We have now found that particularly effective and compatible antistatic agents for use on the class of non-cellulosic, hydrophobic synthetic plastic materials to which this invention relates are the sulfones, i. e. compounds containing the functional group

More particularly the antistatic agents of our invention are sulfones of the class $(RSO_2R')_xR''$ in which R is a lower alkyl with one to six carbon atoms and R' is a divalent hydrocarbon group of one to six carbon atoms; R'' is one of the group comprising (1) hydroxyl, and (2) an ester radical derived by reacting said hydroxyl with a carboxylic acid selected from the group of mono- and dicarboxylic acids consisting of saturated aliphatic monocarboxylic acids, the normal fatty acids, with from 1 to 17 carbon atoms; saturated aliphatic dicarboxylic acids with from 2 to 10 carbon atoms; and benzene dicarboxylic acids with the carboxylic groups attached to the ring; and where $x$ is 1 when R'' is hydroxyl and $x$ is equal to the number of carboxyl groups present in the acid from which R'' is derived when R'' is an ester radical.

The R alkyl group in the compounds having the formula $(RSO_2R')_xR''$ may be methyl, ethyl propyl, butyl, isobutyl, pentyl, isopentyl, hexyl and isohexyl; and R' may be the same or different corresponding substituted alkyl group.

The ester group represented by R'' in the compounds having the formula $(RSO_2R')_xR''$ is preferably the ester of an acid listed in Table 1.

TABLE 1

| | | |
|---|---|---|
| Formic | Lauric | Adipic |
| Acetic | Myristic | Pimelic |
| Propionic | Palmitic | Suberic |
| Enanthic | Margaric | Azelaic |
| Caprylic | Stearic | Sebacic |
| Pelargonic | Malonic | Phthalic |
| Capric | Succinic | Isophthalic |
| n-Undecylic | Glutaric | Terephthalic |

The preferred antistatic agents of our invention are sulfones of the formula $(RSO_2R')_xR''$ in which R is an ethyl group and R' is an ethylene group. Particularly preferred compounds are 2-hydroxyethyl ethyl sulfone and sulfones containing an ester group derived from a carboxylic acid of the group listed in Table 1.

Examples of such preferred antistatic agents are the sulfones listed in Table 2.

TABLE 2

2-hydroxyethyl ethyl sulfone
2-formoxyethyl ethyl sulfone
2-acetoxyethyl ethyl sulfone
2-propionoxyethyl ethyl sulfone
2-enanthonoxyethyl ethyl sulfone
2-capryloxyethyl ethyl sulfone
2-pelargonoxyethyl ethyl sulfone
2-caproxyethyl ethyl sulfone
2-n-undecyloxyethyl ethyl sulfone
2-lauroxyethyl ethyl sulfone
2-myristoxyethyl ethyl sulfone
2-palmitoxyethyl ethyl sulfone
2-margaroxyethyl ethyl sulfone
2-stearoxyethyl ethyl sulfone
2-malonoxyethyl ethyl sulfone
2-succinoxyethyl ethyl sulfone
2-glutaroxyethyl ethyl sulfone
2-adipoxyethyl ethyl sulfone
2-pimeloxyethyl ethyl sulfone
2-suberoxyethyl ethyl sulfone
2-azeloxyethyl ethyl sulfone
2-sebacoxyethyl ethyl sulfone
2-phthaloxyethyl ethyl sulfone
2-isophthaloxyethyl ethyl sulfone
2-terephthaloxyethyl ethyl sulfone Although we do not wish to be bound by a particular theory as to the mode of action of our antistatic agents, we believe that the highly effective antistatic action of our agents is attributable to at least three factors. First, we believe that the sulfone group functions to attract and hold moisture from the atmosphere. Second, we believe that the R'' end of the molecule functions to cause the agent to adhere tenaciously to the surface of a plastic. Third, we believe the antistatic agents of our invention as used are good electrical conductors. The overall effect is that a plastic material to which this invention relates upon treatment with an antistatic agent of our invention is provided with a well-bonded highly conductive coating which continually dissipates static electricity from the material.

The antistatic agents of our invention are readily prepared by the methods described in the following examples in which the parts are by weight unless stated otherwise.

EXAMPLE 1.—PREPARATION OF 2-HYDROXYETHYL ETHYL SULFONE

To a stirred solution of one mole of 2-ethylmercaptoethanol in about two moles of glacial acetic acid at room temperature were added about two moles of hydrogen peroxide as 30% solution. The addition of the first mole caused an exothermic reaction, hence cooling with tap water was necessary. The oxidation of the intermediately formed sulfoxide to the sulfone required that the reaction mass be moderately warmed during the addition of the second mole of $H_2O_2$. The yield of 2-hydroxyethyl ethyl sulfone product was practically quantitative. The product was recrystallized from acetone in a Dry Ice-acetone bath. The purified 2-hydroxyethyl ethyl sulfone melted at about 46° C.

EXAMPLE 2

One method for the preparation of a sulfone containing an ester group derived from a carboxylic acid is demonstrated by the preparation of 2-phthaloxyethyl ethyl sulfone, as follows:

2 moles of 2-hydroxyethyl ethyl sulfone were reacted with 1 mole of phthalic anhydride and excess hydrogen in the presence of sulfuric acid catalyst, the reactions being as follows:

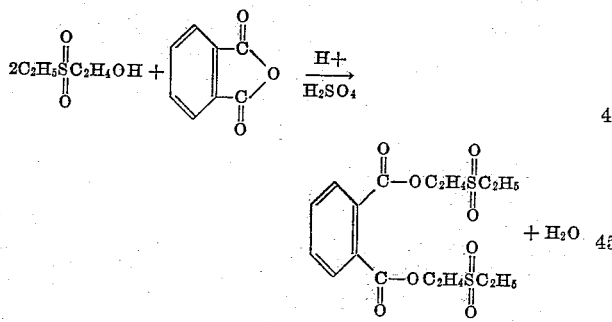

The product, 2-phthaloxyethyl ethyl sulfone, was recovered as a crystalline material, M. P. 75–78° C.

EXAMPLE 3

Another method for the preparation of a sulfone containing an ester group derived from a carboxylic acid is demonstrated by the preparation of 2-pelargonoxyethyl ethyl sulfone as follows:

1 mole of 2-ethylmercaptoethanol was reacted with 1 mole of pelargonic acid to form 2-ethylmercaptoethylpelargonate. The latter compound was then oxidized to 2-pelargonoxyethyl ethyl sulfone with 2 moles of glacial acetic acid using 2 moles of 30% hydrogen peroxide. The reactions which took place were the following:

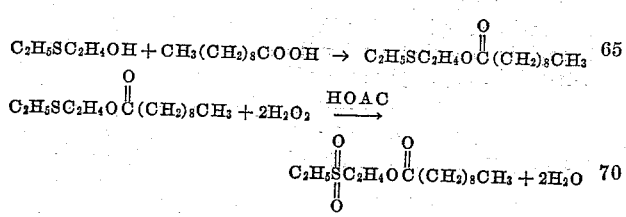

Following substantially the same methods used in Examples 2 and 3 the preferred sulfones listed in Table 2 and the other antistatic agent sulfones of this invention can be prepared for use as antistatic agents in practicing our invention.

The antistatic agents of our invention are readily soluble in polar solvents, such as alcohols, ketones and esters; but in general, the agents are insoluble in non-polar solvents, such as hydrocarbons and halogenated hydrocarbons. 2-hydroxyethyl ethyl sulfone, for example, is soluble in water, ethanol, acetone, acetic acid and ethyl acetate but is insoluble in ether, aliphatic and higher aromatic hydrocarbons and chlorinated aromatics. The solubility characteristics of the sulfones of our invention are of value in the preparation of compositions containing the same for antistatic purposes. Thus the compositions for antistatic use may be readily deposited on the surface of a textile material regardless of the form of the material by treating the textile with a solution or a dispersion of an antistatic sulfone in a polar solvent. On evaporation of the solvent or carrier, the antistatic agent will be retained on the surface of the textile, thereby imparting electrically conductive characteristics to the textile surface. Should removal of the antistatic agent be desired, such removal can readily be done by washing the textile in a suitable solvent without injury to the textile.

The treatment of non-cellulosic hydrophobic synthetic plastic materials to deposit on said materials an effective amount of an antistatic agent and thereby improve the electrostatic qualities of said materials may be carried out by any of the methods commonly used in the art. Somewhat typical of such methods are the methods used in the evaluation of the antistatic agents of our invention and the determination of effective amounts of said agents for antistatic purposes, as demonstrated in the following examples. The parts are by weight unless otherwise stated.

EXAMPLE 5

The compound to be evaluated for its antistatic properties was prepared at a 1% solution in hexane. 0.5 ml. of the solution was pipetted onto one-half of a 4″ x 4″ polystyrene wall tile, spread over the surface and allowed to dry. The tile was then rubbed briskly with a piece of paper tissue to develop a charge on the polystyrene. The rubbed surface was next held about ¼″ above a paper on which were laid ¼″ long hogshair bristles clipped from a paint brush. If the agent being tested were an effective antistat, no bristles would be attracted to the polystyrene surface. Each tile was tested three times, being rubbed vigorously between tests. The effectiveness and durability of the antistatic is influenced by the amount of rubbing, since the rubbing removes some of the agent. A repellant effect after at least two rubbings was used as an acceptable rating. Table 3 shows results obtained with a series of our antistatic agents.

TABLE 3
Static attraction (bristles)

| Agent | Rubbing | | |
|---|---|---|---|
| | 1st | 2nd | 3rd |
| None | | | |
| 2-hydroxyethyl ethyl sulfone | − | − | − |
| 2-phthaloxyethyl ethyl sulfone | + | + | − |
| 2-adipoxyethyl ethyl sulfone | + | + | − |
| 2-pelargonoxyethyl ethyl sulfone | + | + | + |

(−) attracts, poor agent.
(+) no attraction, good agent.

EXAMPLE 6

An ethanol solution containing 0.5% of a compound of this invention was prepared. Skeins of non-cellulosic textile fibers, e. g. Orlon (polyacrylonitrile) and Dacron (polyethylene terephthalate), were then each immersed in the solution for about two minutes. The skeins were then dried. In this manner a deposit of antistat amounting to from 0.5 to 3%, preferably about 2%, by weight of the skein was placed on the textile. The treated skeins were then tested for inhibition of ballooning effect by stroking each skein with a hard rubber rod. Absence of ballooning was indication that the compound deposited on the textile was an effective antistat. Observations were made at various periods of time up to 1 month to determine the duration of the antistatic action. The results obtained with a series of the compounds of this invention are shown in Tables 4A and 4B. Results essentially similar to those shown in Tables 4A and 4B are obtained with other sulfones which contain, for example, in place of the ethyl group, other of the lower alkyl groups such as methyl, propyl, butyl, amyl or hexyl, or which contain, in place of the acid group, other acid radicals as hereinabove enumerated.

TABLE 4A

*Antiballooning effect on Orlon (polyacrylonitrile) fibers*

[15% relative humidity, 75° F.]

| Agent | Approx. percent by wt. agent on fiber, dry basis | Days after Treatment ||||||
|---|---|---|---|---|---|---|
|  |  | 1 | 2 | 7 | 14 | 30 |
|  |  | Ballooning observed in Rubber Rod Test |||||
| 2-hydroxyethyl ethyl sulfone | 2.0 | no | no | no | no | no. |
| 2-phthaloxyethyl ethyl sulfone | 3.0 | no | no | no | no | slight. |
| 2-azeloxyethyl ethyl sulfone | 5.0 |  |  | no | no | no. |
| 2-adipoxyethyl ethyl sulfone | 1.5 | no | no | no | no | no. |
| 2-pelargonoxyethyl ethyl sulfone | 3.0 |  |  | no | no | no. |
| 2-acetoxyethyl ethyl sulfone | 0.4 |  |  | no | no | no. |
| None | none | yes | yes | yes | yes | yes. |

TABLE 4B

*Antiballooning effect on Dacron (polyethylene terephthalate) fibers*

[30% relative humidity, 75° F.]

| Agent | Approx. percent by Wt. agent on fiber, dry basis | Days after Treatment ||||||
|---|---|---|---|---|---|---|
|  |  | 1 | 2 | 7 | 14 | 30 |
|  |  | Ballooning observed in Rubber Rod Test |||||
| 2-hydroxyethyl ethyl sulfone | 2.0 | no | no | no | no | no. |
| 2-azeloxyethyl ethyl sulfone | 1.5 | no | no | no | no | no. |
| 2-adipoxyethyl ethyl sulfone | 1.0 | no | no | no | no | no. |
| 2-pelargonoxyethyl ethyl sulfone | 2.0 | no | no | no | slight | no. |
| 2-acetoxyethyl ethyl sulfone | 1.5 | no | no | no | no | slight. |
| None | none | yes | yes | yes | yes | yes. |

EXAMPLE 7

Swatches of Orlon (polyacrylonitrile) fabric were treated with a 2% solution of 2-hydroxyethyl ethyl sulfone at a variety of pH values. The swatches were dried to room conditions. They were then stroked with a hard rubber rod to determine their resistance to static build-up. The results obtained are shown in Table 5.

TABLE 5

| pH | Percent by weight 2-hydroxyethyl ethyl sulfone on Fabric, Dry Basis | Antistat Effectiveness |
|---|---|---|
| 1.5 | 2.1 | excellent. |
| 3.0 | 1.7 | good. |
| 5.0 | 1.5 | excellent. |
| 7.0 | 1.8 | Do. |
| 9.0 | 1.9 | Do. |
| 10.7 | 0.9 | good. |

Many widely different embodiments of this invention may be made without departing from the scope and spirit of it, and it is to be understood that our invention includes all such embodiments and is not to be limited by the above description.

We claim:

1. A process for imparting antistatic properties to non-cellulosic hydrophobic synthetic plastic materials in the form of fibers, yarns, filaments, films, textiles and the like which comprises depositing on said materials from 0.5 to 5% of an antistatic agent comprising a compound selected from the class consisting of

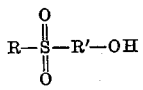

where R is alkyl group of 1 to 6 carbon atoms and R' is a divalent aliphatic hydrocarbon group of 1 to 6 carbon atoms, and esters of said alcohol with an acid selected from the class consisting of saturated aliphatic monocarboxylic acids with from 1 to 17 carbon atoms, saturated aliphatic dicarboxylic acids with from 2 to 10 carbon atoms and benzene dicarboxylic acids with the carboxylic groups attached to the ring.

2. The process of claim 1 in which R is an ethyl group and R' is an ethylene group.

3. A process for improving the antistatic qualities of non-cellulosic hydrophobic textiles which comprises treating said textiles with a solution or dispersion of an antistatic agent of the class defined in claim 1.

4. Non-cellulosic hydrophobic textiles having deposited thereon from 0.5 to 5% by weight of an antistatic agent comprising a compound of the class defined in claim 1.

5. Non-cellulosic hydrophobic textiles having deposited thereon from 0.5 to 5% by weight of antistatic agent comprising a compound of the class defined in claim 2.

6. Non-cellulosic hydrophobic textiles having deposited thereon from 0.5 to 5% by weight of an antistatic agent comprising 2-hydroxyethyl ethyl sulfone.

7. A process according to claim 1 in which the antistatic agent is 2-hydroxyethyl ethyl sulfone.

8. A process according to claim 1 in which the antistatic agent is 2-phthaloxyethyl ethyl sulfone.

9. A process according to claim 1 in which the antistatic agent is 2-azeloxyethyl ethyl sulfone.

10. A process according to claim 1 in which the antistatic agent is 2-adipoxyethyl ethyl sulfone.

11. A process according to claim 1 in which the antistatic agent is 2-pelargonoxyethyl ethyl sulfone.

12. Non-cellulosic hydrophobic synthetic plastic materials having deposited thereon from 0.5 to 5% by weight of an antistatic agent comprising 2-hydroxyethyl ethyl sulfone.

13. Non-cellulosic hydrophobic synthetic plastic materials having deposited thereon from 0.5 to 5% by weight of an antistatic agent comprising 2-phthaloxyethyl ethyl sulfone.

14. Non-cellulosic hydrophobic synthetic plastic materials having deposited thereon from 0.5 to 5% by weight of an antistatic agent comprising 2-azeloxyethyl ethyl sulfone.

15. Non-cellulosic hydrophobic synthetic plastic materials having deposited thereon from 0.5 to 5% by weight of an antistatic agent comprising 2-adipoxyethyl ethyl sulfone.

16. Non-cellulosic hydrophobic synthetic plastic materials having deposited thereon from 0.5 to 5% by weight of an antistatic agent comprising 2-pelargonoxyethyl ethyl sulfone.

References Cited in the file of this patent

UNITED STATES PATENTS

| | | |
|---|---|---|
| 2,127,400 | Gibbs | Aug. 16, 1938 |
| 2,199,989 | Dickey et al. | May 7, 1940 |
| 2,461,474 | Kaszuba | Feb. 8, 1949 |
| 2,543,237 | Evans et al. | Feb. 27, 1951 |